123,443

UNITED STATES PATENT OFFICE.

JULIUS BAUR, OF BROOKLYN, E. D., NEW YORK.

IMPROVEMENT IN THE MANUFACTURE OF STEEL.

Specification forming part of Letters Patent No. 123,443, dated February 6, 1872.

*To all whom it may concern:*

Be it known that I, JULIUS BAUR, of Brooklyn, E. D., in the county of Kings and State of New York, have invented a new and useful Improvement in the Manufacture of Steel; and I do hereby declare the following to be a full, clear, and exact description thereof, which will enable those skilled in the art to make and use the same.

This invention consists in exposing molten iron while in the converter to the action of a compound made of nitrate of soda, binoxide of manganese, and lime, with or without the addition of pure iron-ores, for the purpose of decarbonizing the same by the action of the nitrate and manganese, and of freeing it from sulphur, phosphorus, and other impurities of a similar nature, mainly by the action of the lime. The invention consists further in treating the product obtained by decarbonizing and refining crude iron, as above stated, after the same has been drawn from the converter into ladles, with ferro-manganese for the purpose of increasing the malleability of the steel.

In carrying out my invention I introduce into the bottom of the converter a compound made of nitrate of soda, manganese, and lime in about the following proportion for one hundred pounds of iron: Nitrate of soda, ten pounds; binoxide of manganese, five pounds; lime, two to three pounds. To this compound may be added pure iron-ore, if desired. The lime which I use may be either caustic lime or chloride or muriate of lime or combinations of the same.

After the iron has been melted in a cupola-furnace I draw it off into the converter, where it comes in contact with the nitrate of soda, manganese, and lime, and by the action of the oxygen evolved from the nitrate of soda and binoxide of manganese the iron is decarbonized and converted into steel, while the lime serves particularly to remove from the iron the sulphur and phosphorus mixed therewith, thereby producing a steel of good quality.

Without using lime I have never succeeded to free the iron or steel from sulphur and phosphorus, and the product obtained by treating crude iron with nitrate of soda and binoxide of manganese alone is practically useless, since the presence of a small quantity of sulphur and phosphorus destroys the malleability and toughness of the steel.

In some cases I find it of advantage to add to my compound a quantity of pure iron-ore, whereby the process is extended over a longer period of time, and the degree of decarbonization can be regulated to a certain extent.

After the iron has been converted into steel I remove it from the converter by tapping from the same into a ladle, and on the bottom of this ladle I place a small quantity of ferro-manganese, whereby the malleability of the steel is materially increased. The quantity of ferro-manganese which I use is about one pound to a hundred pounds of iron, and the ferro-manganese which I use contains from thirty-five to forty per cent. of manganese.

What I claim as new, and desire to secure by Letters Patent, is—

1. Exposing molten iron while in a converter to the action of a compound made of nitrate of soda, binoxide of manganese, and lime, substantially in the manner herein set forth.

2. The within-described process of manufacturing steel from crude iron by first exposing the iron to the action of a compound of nitrate of soda, binoxide of manganese, and lime, and then treating the product with ferro-manganese, substantially as herein described.

This specification signed by me this 12th day of August, 1871.

JULIUS BAUR.

Witnesses:
  W. HAUFF,
  E. F. KASTENHUBER.